United States Patent [19]
Grösch et al.

[11] Patent Number: 4,984,651
[45] Date of Patent: Jan. 15, 1991

[54] PASSENGER RESTRAINT SYSTEM

[75] Inventors: Lothar Grösch, Stuttgart; Falk Zeidler, Sindelfingen; Egon Katz, Nagold; Alban Bossenmaier, Gäufelden, all of Fed. Rep. of Germany

[73] Assignee: Daimler-Benz AG, Fed. Rep. of Germany

[21] Appl. No.: 478,839

[22] Filed: Feb. 8, 1990

[30] Foreign Application Priority Data

Feb. 16, 1989 [DE] Fed. Rep. of Germany ....... 3904668

[51] Int. Cl.$^5$ ...................... B60R 21/18; B60R 22/46; B60R 21/32
[52] U.S. Cl. ..................................... 180/268; 180/282; 280/733; 280/735; 280/801; 280/808
[58] Field of Search ............... 280/735, 801, 806, 807, 280/808, 734, 733; 180/268, 282; 307/480, 10.1

[56] References Cited

U.S. PATENT DOCUMENTS

| | | | |
|---|---|---|---|
| 4,243,248 | 1/1981 | Scholz et al. | 280/735 |
| 4,381,829 | 5/1983 | Montaron | 280/735 |
| 4,620,721 | 11/1986 | Scholz et al. | 280/735 |
| 4,933,570 | 6/1990 | Swart et al. | 307/10.1 |

FOREIGN PATENT DOCUMENTS 3413768 7/1985 Fed. Rep. of Germany.

Primary Examiner—Richard A. Bertsch
Assistant Examiner—Tamara L. Finlay
Attorney, Agent, or Firm—Evenson, Wands, Edwards, Lenahan & McKeown

[57] ABSTRACT

A passenger restraint system for motor vehicles is equipped with a safety belt, a belt tensioner, an inflatable airbag and with a switch member which detects the functional position of the safety belt and which is arranged in a belt lock of the safety belt. Activation of the airbag and of the belt tensioner takes place in dependence on the functional position of the safety belt. In order to reduce the risk of injury by the safety belt at medium speeds during the operative period of the airbag, an activatable belt-clamping device on the belt lock and an activatable belt pull-out detent for the shoulder belt are provided. In the presence of a second threshold signal indicating a moderate to serious injury, the airbag is released, the belt-clamping device is arrested. Additionally, the belt pull-out detent is released during the operative period of the airbag.

19 Claims, 1 Drawing Sheet

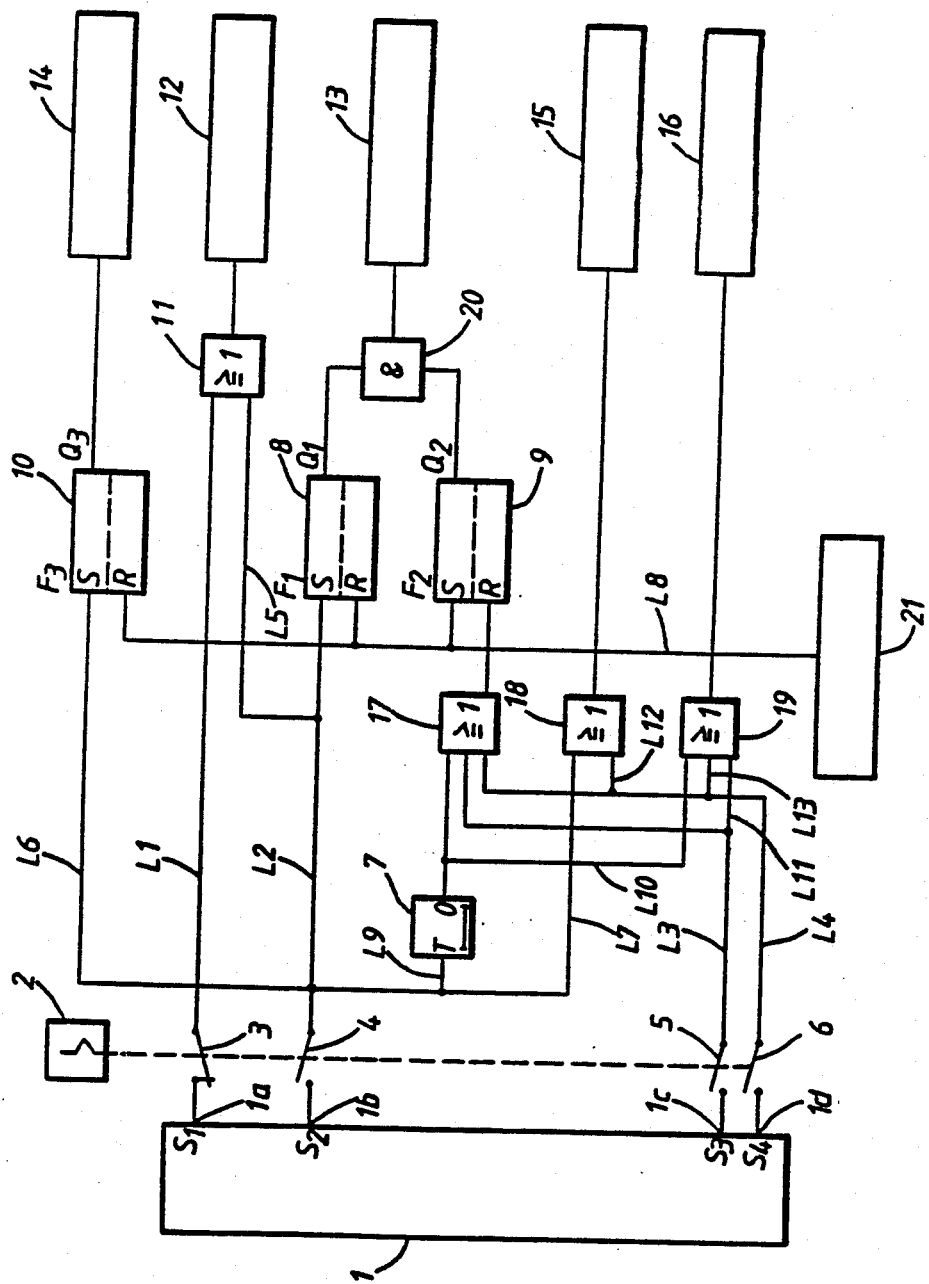

PASSENGER RESTRAINT SYSTEM

BACKGROUND OF THE INVENTION

The invention relates to a passenger restraint system for motor vehicles comprising at least one safety belt on which a belt tensioner is provided; at least one airbag; at least one switch member detecting the functional position of the safety belt and arranged in a belt lock of the safety belt, and at least one sensor that transmits threshold signals, at least in dependence on the effective change of speed of the vehicle, for the activation of the airbag and of the belt tensioner in dependence on the functional position of the safety belt.

A passenger restraint system of this general type is known from German Pat. Specification No. 3,413,768. For protection of the passengers in the event of an accident, that motor vehicle passenger restraint system has safety belts connected to a belt tensioner and at least one inflatable airbag. The passenger restraint system is connected to a control unit having a sensor which activates the individual components of the passenger restraint system in dependence on the effective deceleration of the vehicle. In the presence of a first lower threshold signal of the sensor and with the safety belt fastened, the airbag is not activated. Activation of the airbag occurs only when the second upper threshold signal is transmitted at the sensor. In order to protect the driver effectively and even when the safety belt is not fastened, the first threshold signal is transmitted to the restraint system for causing the release of the airbag. The functional position of the safety belt is detected by a switch member arranged in the belt lock.

In the event of moderate to serious accidents, it has been shown that a fastened shoulder belt can, in some cases, contribute to increasing the risk of injury.

The object on which the invention is based is to design a restraint system of the above general type wherein risk of injury by the shoulder belt is reduced at medium speeds when the airbag is released.

In a restraint system of the relevant generic type, this object is achieved by having an activatable belt-clamping device on the belt lock and an activatable belt pull-out detent for the shoulder belt. Here the sensor transmits at least three different threshold signals. There is a control unit which, when the safety belt is fastened and when the second threshold signal indicating a moderate to serious accident is reached, releases the airbag, arrests the belt-clamping device and releases the belt pull-out detent during the operative period of the airbag and wherein, when the safety belt is fastened and when the third threshold signal indicating a serious accident occurs, arrests the belt pull-out detent. The restraint system according to the invention is based on the knowledge that at medium speeds of between 20 and 50 km/h, the effect of the airbag is sufficient to protect the vehicle passengers in the event of an accident. Therefore, according to the invention, the shoulder belt has an activatable belt pull-out detent which releases the shoulder belt during the operative period of the airbag. During this operative period, the upper body of the vehicle passenger is merely braked by the released airbag. An activatable belt-clamping device is arranged on the belt lock of the safety belt that retains the pelvic region of the vehicle passenger. In this restraint system, there is a sensor which transmits at least three different threshold signals. The first threshold signal is obtained in the event of only minor accidents. The second threshold signal is transmitted in moderate and more serious accidents and the third threshold signal is transmitted in the event of very serious accidents.

If the passenger's safety belt is fastened when the first threshold signal is obtained, there is no activation of the passenger restraint system. In the presence of the second threshold signal and if the vehicle passenger's safety belt is fastened and the airbag is triggered, the shoulder belt is released by means of the activatable belt pull-out detent and the pelvic belt is arrested by means of the activatable belt-clamping device on the belt lock. After an operative period of the airbag, the shoulder belt is once again locked via the belt pull-out detent. In the presence of the third threshold signal and with the vehicle passenger's safety belt fastened, the airbag has already been released in response to the second threshold signal Since the sole effect of the airbag is not sufficient in these accidents, the shoulder belt has to be locked. This is brought about by activating the belt pull-out detent.

In an advantageous embodiment the passenger restraint system is equipped with pelvic-belt and shoulder-belt tensioners separate from one another. In the presence of a second threshold signal in response to which, as stated above, the pelvic belt is fixed by means of the activatable belt-clamping device on the belt lock, an especially good securing of the pelvic region of the vehicle passenger is achieved by means of the pelvic-belt tensioner. After the operative period of the airbag, the belt pull out detent is arrested and at the same time the shoulder-belt tensioner is actuated. The vehicle passenger is thereby protected against a secondary impact.

In another advantageous development the sensor transmits a fourth threshold signal which indicates that the vehicle has overturned. In response to this fourth threshold signal, the control unit is designed so that the pelvic-belt and shoulder-belt tensioners are activated and the belt pull-out detent is arrested. The airbag is consequently not released. If a second threshold signal follows after an overturning (fourth threshold signal), then the shoulder belt remains locked.

In another advantageous embodiment, if the safety belt is not fastened, the airbag is already released when the first threshold signal occurs. The vehicle passenger is thereby protected, in the event of accidents at low speed and with the safety belt not fastened.

It is also advantageous if the belt lock has a first switch contact which, when the safety belt is fastened, breaks a first control line which is connected to an output of the sensor transmitting the first threshold signal to activate the airbag. The switch member possesses further switch contacts which are arranged in further control lines connected to further outputs. To activate the belt pull-out detent of the shoulder belt, there are two flip-flop elements with outputs connected to the belt pull-out detent via an AND element. In a reset state, logically inverted output signals are present at the outputs of the flip-flop elements. The input setting of the first flip-flop element is connected to the second control line and the resetting input of the second flip-flop is activated by means of a timing element. The belt-clamping device is controlled via a third flip-flop element with its input setting connected to the second control line via a control line. The resetting inputs of the first flip-flop element, of the third flip-flop element, and the setting input of the second flip-flop element are activatable by means of a resetting device.

Other objects, advantages and novel features of the present invention will become apparent from the following detailed description of the invention when considered in conjunction with the accompanying drawing.

BRIEF DESCRIPTION OF THE DRAWING

The single FIGURE of the drawing shows a block diagram of the control system of the invention restraint system.

DETAILED DESCRIPTION OF THE DRAWING

The single Figure of the drawing shows a passenger restraint system which is intended to protect the passenger of a motor vehicle in the event of an accident. The passenger restraint system is based on the known three-point safety belt system that has a pelvic belt (not shown) and a shoulder belt (not shown). Here a separate pelvic-belt tensioner 15 and shoulder-belt tensioner 16 are provided for tightening the safety belt. The safety belt is secured to a belt lock by a belt-clamping device 14. Furthermore, the passenger restraint system possesses an inflatable airbag 12 which can be arranged on the steering wheel of the motor vehicle A seat belt release 13 is provided to release the seat belt when the airbag 12 is activated.

The control unit for the components 12, 13, 14, 15, 16 possesses a sensor 1 which transmits four threshold signals S1, S2, S3, S4. The threshold signal S1 is transmitted in the event of accidents of only minor seriousness. The threshold signal S2 is transmitted in the event of moderate to serious accidents and the third threshold signal S3 in the event of serious accidents. If the vehicle overturns, the sensor 1 transmits a threshold signal S4. The threshold signals S1, S2, S3, S4, presented at the outputs 1a, 1b, 1c, 1d, bring about actuation of the components 12, 13, 14, 15, 16, of the passenger restraint system as described below:

To afford protection to the vehicle passengers even when the safety belt is not fastened and in the presence of the first threshold signal S1, a switch member 2 with switch contact 3 is provided in the belt lock of the safety belt. The switch contact 3 is arranged in the control line L1 and is designed as a break contact. When the safety belt is not fastened, the closed switch contact 3 causes the activation of the airbag 12 via the OR element 11. Further switch contacts 4, 5, 6 are provided on the switch member 2 and are designed as make contact in control lines L2, L3, L4. When the safety belt is not fastened, the switch contacts 4, 5, 6 are consequently opened. Threshold signals S2, S3 cannot provide any release of the airbag 12, since it has already been released by of means of the threshold signal S1. In the presence of the fourth threshold signal S4, there is no release if the safety belt is not fastened. If the safety belt is fastened, the switch contacts 4, 5, 6 are closed, thus making it possible for the threshold signals S2, S3, S4 to be transmitted to the components 12, 13, 14, 15, 16 of the passenger restraint system.

When a second threshold signal S2 is present at the output 1b of the sensor 1 and the switch contact 4 is closed, the activation of the airbag 12 takes place via the control lines L2, L5 and the OR element 11. In order to reduce the risk of injury to the vehicle passenger by the shoulder belt during the operative period of the airbag 12, the shoulder belt is released during the operative period of the airbag 12. For this purpose, there is an activatable belt pull-out detent 13. Its activation is caused by two flip-flop elements 8, 9. The outputs of the flip-flop elements 8, 9 are set logically inverting by means of a resetting device 21. The inputs of an AND element 20 are connected to the outputs of the flip-flop elements 8, 9. When the flip-flop elements 8, 9 are in the reset state, the belt pull-out detent is locked at the statutory fixed belt-acceleration and vehicle-acceleration values. When a signal is present at the setting input S of the flip-flop element 8, the output signal Q1 of the flip-flop element 8 assumes a value logically identical to that of the output signal Q2 of the second flip-flop element. Both conditions are therefore satisfied at the AND element 20. This results in the belt pull-out detent 13 being activated and the shoulder belt is released.

The release of the shoulder belt will be maintained only during the operative period of the airbag 12. This is achieved by means of a timing element 7 which, after a time delay occurring on the operation of the airbag 12, activates the resetting input R of the second flip-flop element 9 via an OR element 17. This produces an output signal Q2 at the second flip-flop element 9 which is opposite to the output signal Q1. The two conditions are therefore not simultaneously satisfied at the AND element 20. As a result, the belt pull-out detent 13 is locked.

At the same time as the belt pull-out detent 13 is activated, a third flip-flop element 10 is activated via the control line L6 to actuate the belt-clamping device 14 on the belt lock. The resetting inputs R of the flip-flop elements 8, 10 and the setting input S are connected to a resetting device 21 via a control line L8.

The activation of the pelvic-belt tensioner 15 and the shoulder-belt tensioner 16 occurs in the presence of the second threshold signal S2 via the OR elements 18, 19. The OR element 18 is located in a control line L7 which branches off from the control line L2. The pelvic-belt tensioner 15, the belt-clamping device 14 and the airbag 12 are consequently released simultaneously. A control line L9 branches off from the control line L7 and is connected to the resetting input R of the flip-flop element 9 via the timing element 7 and the OR element 17. The control line L10 branches off at the output of the timing element 7 to provide a control signal to the shoulder-belt tensioner 16.

In the presence of a threshold signal S3 at the sensor 1 and with the switch contact 5 closed, the resetting input R of the flip-flop element 9 is activated via the control line L3 and the OR element 17. This once again leads to the locking of the belt pull-out detent because the latter was released in response to the threshold signal S2. A control signal is sent to the shoulder-belt tensioner 16 via the OR element 19 by way of a control line L11 branching off from the control line L3. As already described above, the second threshold signal S2 also Present in addition to the third threshold signal S3, causes the activation of the airbag 12, belt-clamping device 14 and pelvic-belt tensioner 15.

In the presence of a fourth threshold signal S4 indicating that the vehicle has overturned and with the switch contact 6 of the switch member 2 closed at the same time, the resetting input R of the second flip flop element 9 is activated via the control line L4 and the OR element 17. Different output signals Q1, Q2 are thereby once again present at the flip-flop elements 8, 9, thereby ensuring the locking of the belt pull-out detent 13. The pelvic-belt tensioner 15 is activated by the control line L12 branching off from the control line L4 tensioner 16 takes place in the same way via the control line and the OR element 18 The activation of the shoulder-belt L13, which branches off from the control L4, and the OR element 19.

It is also possible for the passenger restraint system to be equipped with only one belt tensioner.

The above-described belt-clamping device 14 can be obtained in a simple way be means of a holding part intended for the safety belt and movably arranged on the lock tongue. In the lock tongue there is a recess, above which the holding part is arranged. The safety belt is guided through the recess and round the holding part If, for example, the holding part is activated electromechanically, the safety belt is clamped in the edge region of the recess between the holding part and the lock tongue.

The above-described activatable belt pull-out detent 13 can be obtained by means of an electrically activated coupling. The complete uncoupling of the belt-reeling mechanism from the locking system can be provided. It is also possible to provide a slip coupling by which the belt band can be pulled out counter to an adjustable force.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Passenger restraint system for motor vehicles comprising:
   at least one safety belt including a lap belt portion and a shoulder belt portion for which belt tensioner means is provided;
   at least one airbag;
   at least one switch means is a belt lock of the safety belt for detecting a functional position of the safety belt;
   a sensor which transmits threshold signals at least in dependence on effective changes of speed of the vehicle;
   wherein an activation of the airbag and of the belt tensioner means takes place in dependence of a functional position of the safety belt as detected by the switch means;
   wherein there is an activatable belt-clamping device on the belt lock and an activatable belt pull-out detent for the shoulder belt portion of the safety belt;
   wherein the sensor transmits at least three different threshold signals; and
   wherein there is a control unit means which, when the safety belt is fastened and when a second of the three threshold signals occurs to indicate a moderate to serious accident, releases the airbag, arrests the belt-clamping device and releases the belt pull-out detent during an operative releasing period of the airbag and which, when the safety belt is fastened and when the third threshold signal occurs to indicate a very serious accident, arrests the belt pull-out detent.

2. Passenger restraint system according to claim 1, wherein during the presence of the second threshold signal, the control unit activates a pelvic-belt tensioner and, after the operative releasing period of the airbag, arrests the belt pull-out detent and actuates a shoulder-belt tensioner.

3. Passenger restraint system according to claim 2, wherein the sensor transmits a fourth threshold signal which indicates that the vehicle has overturned.

4. Passenger restraint system according to claim 3, wherein the fourth threshold signal causes the control unit to activate the belt tensioner means to tension both the pelvic-belt and shoulder-belt portions and also arrests the belt pull-out detent.

5. Passenger restraint system according to claim 4, wherein, when the safety belt is not fastened as sensed by the switch means and in the presence of a first threshold signal that indicates a minor accident, the airbag is released.

6. Passenger restraint system according to claim 3, wherein, when the safety belt is not fastened as sensed by the switch means and in the presence of a first threshold signal that indicates a minor accident, the airbag is released.

7. Passenger restraint system according claim 2, wherein, when the safety belt is not fastened as sensed by the switch means and in the presence of a first threshold signal that indicates a minor accident, the airbag is released.

8. Passenger restraint system according to claim 1, wherein the sensor transmits a fourth threshold signal which indicates that the vehicle has overturned.

9. Passenger restraint system according to claim 8, wherein the fourth threshold signal causes the control unit to activate the belt tensioner means to tension both the pelvic-belt and shoulder-belt portions and also arrests the belt pull-out detent.

10. Passenger restraint system according to claim 9, wherein when the safety belt is not fastened as sensed by the switch means and in the presence of a first threshold signal that indicates a minor accident, the airbag is released.

11. Passenger restraint system according to claim 8, wherein, when the safety belt is not fastened as sensed by the switch means and in the presence of a first threshold signal that indicates a minor accident, the airbag is released.

12. Passenger restraint system according to claim 1, wherein, when the safety belt is not fastened as sensed by the switch means and in the presence of a first threshold signal that indicates a minor accident, the airbag is released.

13. Passenger restraint system according to claim 12, wherein the switch member in the belt lock has a first switch contact which when the safety belt is fastened, breaks a first control line which is connected to an output of the sensor transmitting the first threshold signal and via which the airbag is activated.

14. Passenger restraint system according to claim 1, wherein the switch member possesses further switch contacts which are arranged in further control lines connected to further outputs of the sensor.

15. Passenger restraint system according to claim 1, wherein the control unit means activates the belt pull-out detent of the shoulder belt via two flip-flop elements from which outputs are connected to the belt pull-out detent via an AND element.

16. Passenger restraint system according to claim 15, wherein in a reset state, logically inverted output signals are present at the outputs of the two flip-flop elements.

17. Passenger restraint system according to claim 16, wherein a setting input of a first of the two flip-flop elements is connected to a second control line that operates the airbag and the pull-out detent and wherein there is a resetting input for the second flip-flop element which is activated by means of a timing element.

18. Passenger restraint system according to claim 17, wherein the belt-clamping device is controlled via a third flip-flop element which has a setting input connected to the second control line via another control line.

19. Passenger restraint system according to claim 18, wherein there is a resetting input of the first of the two flip-flop elements and of a third flip-flop element and the setting input of the second of the two flip-flop elements are all activatable by means of a resetting device.

* * * * *